United States Patent [19]

Mita et al.

[11] Patent Number: 5,763,342
[45] Date of Patent: Jun. 9, 1998

[54] ULTRAVIOLET RAY ABSORBING COLORED GLASS

[75] Inventors: Setsuko Mita; Toru Kudo; Shiro Tanii, all of Yokohama, Japan

[73] Assignee: Asahi Glass Company Ltd., Tokyo, Japan

[21] Appl. No.: 798,100

[22] Filed: Feb. 12, 1997

[30] Foreign Application Priority Data

Feb. 16, 1996 [JP] Japan ................................ 8-029603

[51] Int. Cl.⁶ ........................... C03C 3/095; C03C 3/087
[52] U.S. Cl. ................................ 501/64; 501/70; 501/71
[58] Field of Search .................................. 501/64, 70, 71

[56] References Cited

U.S. PATENT DOCUMENTS

| | | | |
|---|---|---|---|
| 5,318,931 | 6/1994 | Nakaguchi et al. | 501/70 |
| 5,344,798 | 9/1994 | Morimoto et al. | 501/70 |
| 5,364,820 | 11/1994 | Morimoto et al. | 501/70 |
| 5,380,685 | 1/1995 | Morimoto et al. | 501/70 |
| 5,558,942 | 9/1996 | Itoh et al. | 501/70 |
| 5,593,929 | 1/1997 | Krumwiede et al. | 501/70 |

FOREIGN PATENT DOCUMENTS

| | | |
|---|---|---|
| 43 13 215 A 1 | 10/1993 | Germany . |
| 5-58670 | 3/1993 | Japan . |
| 5-270855 | 10/1993 | Japan . |
| 6-40741 | 2/1994 | Japan . |
| 6-92678 | 4/1994 | Japan . |
| 6-345482 | 12/1994 | Japan . |

OTHER PUBLICATIONS

Patent Abstracts of Japan, vol. 95, No. 003, Itou Mizuki, et al "Ultraviolet–Absorbing Colored Glass", Dec. 20, 1994.

*Primary Examiner*—Karl Group
*Attorney, Agent, or Firm*—Oblon, Spivak, McClelland, Maier & Neustadt, P.C.

[57] ABSTRACT

Ultraviolet ray absorbing colored glass, which comprises 100 parts by weight of soda lime silicate glass as a base component and coloring components consisting essentially of from 0.12 to 0.7 part by weight of total iron as calculated as $Fe_2O_3$, from 0.2 to 2.0 parts by weight of total cerium as calculated as $CeO_2$, from 1.0 to 2.5 parts by weight of total titanium as calculated as $TiO_2$, from 0 to 0.01 part by weight of CoO and from 0.0001 to 0.02 part by weight of Se, and which has an ultraviolet ray transmittance of at most 10%, as stipulated in ISO-9050 and as calculated as of a thickness of 5 mm, whereby the dominant wavelength measured by illuminant C is within a range of from 565 to 600 nm.

13 Claims, No Drawings

ULTRAVIOLET RAY ABSORBING COLORED GLASS

The present invention relates to ultraviolet ray absorbing glass of a brown color having a high ultraviolet ray absorbing ability and a relatively high visible ray transmittance. Particularly, it relates to ultraviolet ray absorbing glass of a brownish gray color, whereby the excitation purity is not so high.

Heretofore, as brown or gray-colored glass for buildings or vehicles, one containing FeO, $Fe_2O_3$, $CeO_2$, $TiO_2$, CoO and Se, and NiO as an optional component, has been known.

For example, JP-A-5-58670 and JP-A-6-92678 disclose bronze glass having $TiO_2$ incorporated in an amount of from 0 to 1 wt % to let it partially take over the ultraviolet absorbing function of cerium oxide. With respect to the amount of $TiO_2$ to be incorporated, the upper limit is described to be 1%, since $TiO_2$ absorbs visible rays on a short wavelength side and thus reduces the visible ray transmittance, by the coexistence with iron oxide.

In Examples of JP-A-5-58670, ultraviolet ray absorbing bronze glass is prepared by incorporating FeO, $Fe_2O_3$, $CeO_2$, Se, from 0.1 to 0.5 wt % of $TiO_2$, and, if necessary, CoO and NiO. In Examples of JP-A-6-92678, ultraviolet ray absorbing bronze glass is prepared by incorporating at least 0.2 wt % of total $Fe_2O_3$, $CeO_2$ and from 0.24 to 0.4 wt % of $TiO_2$, and, if necessary, CoO and NiO. However, in the Examples of JP-A-6-92678, the ultraviolet ray transmittance is, even at the lowest, at a level of 25% in a thickness of 4 mm.

Further, JP-A-5-270855 and JP-A-6-40741 disclose neutral gray-colored glass whereby the influence to the color has been reduced by combining $TiO_2$ limited from 0.15 to 0.45 wt % and $CeO_2$ limited to from 0.2 to 0.6 wt %. In its Examples, neutral gray-colored glass having a ultraviolet ray transmittance of a level of from 18 to 22% in a thickness of 4 mm is obtained. In Examples of JP-A-6-40741, neutral gray-colored glass having a ultraviolet ray transmittance of a level of from 16.7 to 19.43% in a thickness of 4 mm is obtained.

Furthermore, JP-A-6-345482 discloses brown glass having $TiO_2$ incorporated in an amount of from 0 to 1 wt % for partial substitution of cerium oxide. The ultraviolet ray transmittance of the glass disclosed in its Examples, exceeds 10% as calculated as of a thickness of 5 mm.

In recent years, especially for windshields for vehicles, a glass having the ultraviolet ray transmittance further reduced, has been desired. With the above-mentioned conventional products, the ultraviolet ray transmittance exceeds 10% as calculated as of a thickness of 5 mm, such does not fully satisfy the requirement of recent years.

It is an object of the present invention to provide a glass which is capable of adequately absorbing ultraviolet rays and relatively highly transmitting visible rays and which exhibits a brown or gray color, by incorporating various colorants in a controlled manner to a base component of soda lime silica which is common glass for buildings or vehicles.

The present invention provides ultraviolet ray absorbing colored glass, which comprises 100 parts by weight of soda lime glass as a base component and coloring components consisting essentially of from 0.12 to 0.7 part by weight of total iron as calculated as $Fe_2O_3$, from 0.2 to 2.0 parts by weight of total cerium as calculated as $CeO_2$, from 1.0 to 2.5 parts by weight of total titanium as calculated as $TiO_2$, from 0 to 0.01 part by weight of CoO and from 0.0001 to 0.02 part by weight of Se, and which has an ultraviolet ray transmittance of at most 10%, as stipulated in ISO-9050 and as calculated as of a thickness of 5 mm, whereby the dominant wavelength measured by illuminant C is within a range of from 565 to 600 nm.

The present invention is the one having predetermined amounts of coloring components incorporated to a base component composed of soda lime silicate glass. The coloring components will now be described.

If the content of total iron as calculated as $Fe_2O_3$ is less than 0.12 part by weight per 100 parts by weight of the base component, the dominant wavelength tends to be too short, whereby it tends to be difficult to obtain glass having a brown or gray color. On the other hand, if it exceeds 0.7 part by weight, the visible ray transmittance tends to be low. In order to obtain glass having a low excitation purity while maintaining a high visible ray transmittance, the content of the total iron is preferably at most 0.4 part by weight per 100 parts by weight of the base component.

Cerium is available mainly as $Ce^{3+}$ and $Ce^{4+}$, both of which have ultraviolet ray absorbing effects. If the total cerium as calculated as $CeO_2$ is less than 0.2 part by weight per 100 parts by weight of the base component, such effects tend to be small, and if it exceeds 2.0 parts by weight, the influence of absorption of visible rays tends to be large. To impart a higher ultraviolet ray absorbing ability to the glass, the total cerium is preferably at least 0.4 part by weight per 100 parts by weight of the base component. On the other hand, if the amount of cerium is large, the excitation purity tends to be large. To obtain glass having a brown color close to gray, which is more harmonic to the interior color when used as a window glass, the total cerium is preferably at most 1.5 parts by weight per 100 parts by weight of the base component.

It is possible to increase the ultraviolet ray absorbing ability by using titanium in combination with cerium. Cerium which has absorption in a near ultraviolet region, is $Ce^{3+}$. Accordingly, it is possible to attain a further effect for near ultraviolet ray absorption by reducing $CeO_2$ with $Ti_2O_3$. As compared with cerium, titanium gives a less effect for increasing the excitation purity by incorporation. Accordingly, to obtain glass having a brown color close to gray, titanium is a component rather preferred to cerium.

If the content of total titanium as calculated as $TiO_2$ is less than 1.0 part by weight per 100 parts by weight of the base component, the ultraviolet ray transmittance tends to be too high, and if it exceeds 2.5 parts by weight, the visible ray transmittance is likely to be low. For the purpose of obtaining glass having a lower ultraviolet ray transmittance, the content of total titanium as calculated as $TiO_2$ is preferably at least 1.05 part by weight, more preferably at least 1.1 parts by weight, per 100 parts by weight of the base component.

Se is a component which adjusts the color to brown or gray. If its content is less than 0.0001 part by weight per 100 parts by weight of the base component, the dominant wavelength tends to be too short, whereby it tends to be difficult to obtain glass having a brown or gray color. On the other hand, if it exceeds 0.02 part by weight, the coloring effect will saturate and no further effects will be obtained. To bring the dominant wavelength as measured by illuminant C (hereinafter referred to simply as the dominant wavelength) to a level of at least 575 nm, Se is preferably at least 0.0004 part by weight per 100 parts by weight of the base component. Further, with a view to reducing the cost, it is preferably at most 0.01 part by weight per 100 parts by weight of the base material.

Usual brown-colored glass is prepared in most cases by an addition of Se to shift the green color caused by the presence of Fe to a long wavelength side. In the present invention, relatively large amounts of cerium and titanium are incorporated, and merely by adding Se in the same manner as the conventional brown-colored glass, it may sometimes be difficult to obtain a brown color.

Therefore, in the present invention, the proportion of bivalent iron as calculated as $Fe_2O_3$ in the total iron calculated as $Fe_2O_3$ is preferably at most 19%, more preferably at most 17%, most preferably at most 15%, whereby it is possible to shift the dominant wavelength of glass to a long wavelength side and to obtain a brown color, in combination with the effect of the addition of Se, and at the same time the excitation purity can be suppressed to a relatively low level. The amount of bivalent iron (FeO) typically incorporated to the glass of the present invention is, for example, at most 0.1 part by weight per 100 parts by weight of the base component.

CoO is not essential. However, it may be incorporated when it is necessary to lower the excitation purity. If its content exceeds 0.01 part by weight per 100 parts by weight of the base component, the dominant wavelength tends to be too short, whereby it tends to be difficult to obtain glass having a brown or gray color. CoO tends to lower the visible ray transmittance, and in order to maintain a high visible ray transmittance, its content is preferably at most 0.005 part by weight per 100 parts by weight of the base component.

On the other hand, the glass of the present invention contains relatively large amounts of cerium and titanium and thus tends to have a high excitation purity as compared with conventional glass having a relatively high ultraviolet ray transmittance. In order to obtain glass having a low excitation purity (at most 12%, preferably at most 10%) and having a relatively distinct brown color (the dominant wavelength measured by standard source C being at least 575 nm), it is preferred to incorporate CoO in an amount of at least 0.002 part by weight per 100 parts by weight of the base component.

The composition of soda lime silicate glass as the base component preferably comprises the following components:

| | |
|---|---|
| $SiO_2$ | 65 to 75 wt % |
| $Al_2O_3$ | 0.1 to 5 wt % |
| $Na_2O$ | 10 to 18 wt % |
| $K_2O$ | 0 to 5 wt % |
| CaO | 5 to 15 wt % |
| MgO | 0 to 6 wt %. |

If the content of $SiO_2$ is less than 65 wt %, the weather resistance tends to be poor, and if it exceeds 75 wt %, devitrification tends to result.

If the content of $Al_2O_3$ is less than 0.1 wt %, the water resistance tends to be low, and if it exceeds 5 wt %, the solubility tends to be low.

$Na_2O$ and $K_2O$ are components which accelerate dissolution of starting materials. If the content of $Na_2O$ is less than 10 wt %, the effect is small, and if it exceeds 18 wt %, the weather resistance tends to be poor. $K_2O$ is not an essential component, but may be contained. If its content exceeds 5 wt %, the cost will be high.

CaO and MgO are components which promote dissolution of starting materials and which improve the weather resistance. If the content of CaO is less than 5 wt %, such an effect is small, and if it exceeds 15 wt %, devitrification is likely to result. MgO is not an essential component, but may be contained. If its content exceeds 6 wt %, devitrification is likely to result.

$SO_3$ may be used as a refining agent. In such case, the content of $SO_3$ remained is typically in a range of from 0.05 to 1.0 wt %.

The glass of the present invention typically has an ultraviolet ray transmittance of at most 10% as of a thickness of 5 mm, whereby the dominant wavelength is within a range of from 565 to 600 nm. The excitation purity can be adjusted depending upon the particular application and may be adjusted within a range of from 0 to 15%. Further, the solar radiation transmittance will be typically from 50 to 80%, especially from 60 to 80% in a thickness of 4 mm, although the present invention is not restricted to such a range. Especially for application to vehicles, it is preferred that the visible ray transmittance is at least 70% as measured by illuminant A in a thickness of from 2 to 6 mm, especially from 3 to 5 mm.

The following composition is preferred in order to obtain brownish gray colored glass, specifically a glass whereby the dominant wavelength is within a range of from 570 to 600 nm, preferably from 575 to 600 nm, and the excitation purity is at most 12%, preferably at most 10%.

Namely, the composition comprises 100 parts by weight of soda lime glass as a base component and coloring components consisting essentially of from 0.12 to 0.4 part by weight of total iron calculated as $Fe_2O_3$, from 0.2 to 1.5 parts by weight of total cerium as calculated as $CeO_2$, from 1.0 to 2.5 parts by weight of total titanium as calculated as $TiO_2$, from 0.002 to 0.01 part by weight of CoO and from 0.0001 to 0.02 part by weight of Se, wherein the proportion of bivalent iron as calculated as $Fe_2O_3$ in the total iron as calculated as $Fe_2O_3$, is at most 19%.

In order to bring the visible ray transmittance as measured by illuminant A to a level of at least 70% with the above composition, the proportion of the bivalent iron in the total iron is preferably at most 17%.

A glass sheet made of the glass of the present invention is excellent in the ultraviolet ray absorbing ability, and the ultraviolet ray transmittance can be adjusted to a level of at most 10% as stipulated in ISO-9050 in the real thickness of the glass sheet. Accordingly, such a glass sheet is preferred for building or vehicles. Especially a glass sheet having a real thickness of from 2 to 6 mm having a visible ray transmittance of at least 70% as measured by illuminant A, in addition to the above-mentioned dominant wavelength and the ultraviolet ray absorbing ability of the glass of the present invention, is particularly preferred for vehicles, since an exterior object can easily be seen through and there will be no deterioration of the interior by ultraviolet rays.

Now, the present invention will be described in further detail with reference to Examples. However, it should be understood that the present invention is by no means restricted to such specific Examples.

EXAMPLES 1 to 56

A batch was formulated by using, as raw materials, silica sand, feldspar, dolomite, soda ash, Glauber's salt, ferric oxide, cerium oxide, titanium dioxide, sodium selenite and coke, and it was melted in an atmosphere ($O_2$ concentration: about 2.0%) similar to the atmosphere for practical operation, followed by proper forming and annealing, to obtain brown or gray-colored glass having the base composition (unit: wt %), colorant composition (unit: parts by weight per 100 parts by weight of the base composition) and REDOX (the weight proportion of bivalent iron as calculated as $Fe_2O_3$ in the total iron as calculated as $Fe_2O_3$, the reduced ratio) as identified in Tables 1, 2 or 3. In the Tables, $t-Fe_2O_3$ means the total iron as calculated as $Fe_2O_3$.

Then, with respect to this glass, the visible ray transmittance $T_{va}$ as of a thickness of 4 mm as measured by illuminant A, the solar radiation transmittance $T_E$ as of a thickness of 4 mm, the dominant wavelength $D_w$, the excitation purity $P_e$ as of a thickness of 4 mm, the transmittance $T_{370}$ of light with a wavelength of 370 nm as of a thickness of 3.5 mm, and the ultraviolet ray transmittance $T_{uv}$ as of a thickness of 5 mm, were measured. The results are shown in Tables 4 to 6. The visible ray transmittance and the solar radiation transmittance were determined in accordance with JIS R3160, the dominant wavelength and the excitation purity were determined in accordance with JIS Z8701, and the ultraviolet ray transmittance was determined in accordance with ISO-9050.

As is apparent from the Tables, the glass of the present invention exhibits a brown or gray color and is excellent in the ultraviolet ray absorbing ability.

TABLE 1

| Example No. | Base composition (wt %) | | | | | | | Colorant composition (parts by weight) | | | | | | REDOX |
|---|---|---|---|---|---|---|---|---|---|---|---|---|---|---|
| | SiO2 | Al2O3 | MgO | CaO | Na2O | K2O | SO3 | t-Fe2O3 | FeO | TiO2 | CeO2 | CoO | Se | |
| 1 | 72.6 | 2.2 | 3.9 | 7.7 | 12.9 | 0.7 | 0.1 | 0.35 | 0.018 | 1.10 | 1.00 | 0.0000 | 0.0008 | 5.8% |
| 2 | 72.6 | 2.2 | 3.9 | 7.7 | 12.9 | 0.7 | 0.1 | 0.35 | 0.024 | 1.10 | 1.00 | 0.0000 | 0.0005 | 7.7% |
| 3 | 72.9 | 1.7 | 3.9 | 7.7 | 13.0 | 0.7 | 0.1 | 0.23 | 0.023 | 1.20 | 0.60 | 0.0015 | 0.0014 | 10.9% |
| 4 | 72.9 | 1.7 | 3.9 | 7.7 | 13.0 | 0.7 | 0.1 | 0.23 | 0.023 | 1.20 | 0.60 | 0.0014 | 0.0012 | 11.3% |
| 5 | 72.9 | 1.7 | 3.9 | 7.7 | 13.0 | 0.7 | 0.1 | 0.23 | 0.029 | 1.20 | 0.60 | 0.0018 | 0.0001 | 14.1% |
| 6 | 72.9 | 1.7 | 3.9 | 7.7 | 13.0 | 0.7 | 0.1 | 0.23 | 0.016 | 1.20 | 1.00 | 0.0029 | 0.0019 | 7.7% |
| 7 | 72.9 | 1.7 | 3.9 | 7.7 | 13.0 | 0.7 | 0.1 | 0.25 | 0.022 | 1.20 | 0.60 | 0.0023 | 0.0017 | 9.9% |
| 8 | 72.9 | 1.7 | 3.9 | 7.7 | 13.0 | 0.7 | 0.1 | 0.25 | 0.012 | 1.20 | 0.80 | 0.0027 | 0.0035 | 5.4% |
| 9 | 72.9 | 1.7 | 3.9 | 7.7 | 13.0 | 0.7 | 0.1 | 0.25 | 0.014 | 1.20 | 0.80 | 0.0025 | 0.0031 | 6.0% |
| 10 | 72.9 | 1.7 | 3.9 | 7.7 | 13.0 | 0.7 | 0.1 | 0.25 | 0.014 | 1.20 | 0.80 | 0.0024 | 0.0025 | 6.2% |
| 11 | 72.9 | 1.7 | 3.9 | 7.7 | 13.0 | 0.7 | 0.1 | 0.25 | 0.015 | 1.20 | 0.80 | 0.0038 | 0.0023 | 6.7% |
| 12 | 72.9 | 1.7 | 3.9 | 7.7 | 13.0 | 0.7 | 0.1 | 0.25 | 0.015 | 1.20 | 0.80 | 0.0031 | 0.0018 | 6.8% |
| 13 | 72.9 | 1.7 | 3.9 | 7.7 | 13.0 | 0.7 | 0.1 | 0.25 | 0.017 | 1.20 | 0.80 | 0.0026 | 0.0023 | 7.5% |
| 14 | 72.9 | 1.7 | 3.9 | 7.7 | 13.0 | 0.7 | 0.1 | 0.25 | 0.017 | 1.20 | 0.80 | 0.0031 | 0.0022 | 7.6% |
| 15 | 72.9 | 1.7 | 3.9 | 7.7 | 13.0 | 0.7 | 0.1 | 0.25 | 0.008 | 1.20 | 1.00 | 0.0027 | 0.0037 | 3.6% |
| 16 | 72.9 | 1.7 | 3.9 | 7.7 | 13.0 | 0.7 | 0.1 | 0.25 | 0.015 | 1.20 | 1.00 | 0.0034 | 0.0019 | 6.6% |
| 17 | 72.9 | 1.7 | 3.9 | 7.7 | 13.0 | 0.7 | 0.1 | 0.25 | 0.016 | 1.20 | 1.00 | 0.0036 | 0.0017 | 7.2% |
| 18 | 72.9 | 1.7 | 3.9 | 7.7 | 13.0 | 0.7 | 0.1 | 0.25 | 0.018 | 1.20 | 1.00 | 0.0035 | 0.0015 | 8.2% |
| 19 | 72.9 | 1.7 | 3.9 | 7.7 | 13.0 | 0.7 | 0.1 | 0.25 | 0.026 | 1.20 | 1.00 | 0.0026 | 0.0011 | 11.7% |

TABLE 2

| Example No. | Base composition (wt %) | | | | | | | Colorant composition (parts by weight) | | | | | | REDOX |
|---|---|---|---|---|---|---|---|---|---|---|---|---|---|---|
| | SiO2 | Al2O3 | MgO | CaO | Na2O | K2O | SO3 | t-Fe2O3 | FeO | TiO2 | CeO2 | CoO | Se | |
| 20 | 72.9 | 1.7 | 3.9 | 7.7 | 13.0 | 0.7 | 0.1 | 0.25 | 0.026 | 1.20 | 1.00 | 0.0028 | 0.0009 | 11.8% |
| 21 | 72.9 | 1.7 | 3.9 | 7.7 | 13.0 | 0.7 | 0.1 | 0.25 | 0.028 | 1.20 | 1.00 | 0.0028 | 0.0009 | 12.2% |
| 22 | 72.6 | 2.1 | 3.9 | 7.7 | 12.9 | 0.7 | 0.1 | 0.25 | 0.011 | 1.20 | 0.80 | 0.0026 | 0.0051 | 5.1% |
| 23 | 72.6 | 2.1 | 3.9 | 7.7 | 12.9 | 0.7 | 0.1 | 0.25 | 0.008 | 1.20 | 0.80 | 0.0034 | 0.0078 | 3.4% |
| 24 | 72.6 | 2.1 | 3.9 | 7.7 | 12.9 | 0.7 | 0.1 | 0.25 | 0.009 | 1.20 | 0.80 | 0.0025 | 0.0059 | 3.9% |
| 25 | 72.6 | 2.1 | 3.9 | 7.7 | 12.9 | 0.7 | 0.1 | 0.25 | 0.019 | 1.20 | 0.80 | 0.0026 | 0.0025 | 8.3% |
| 26 | 72.2 | 2.0 | 3.9 | 7.6 | 13.4 | 0.7 | 0.1 | 0.25 | 0.009 | 1.20 | 0.80 | 0.0030 | 0.0051 | 4.0% |
| 27 | 72.2 | 2.0 | 3.9 | 7.6 | 13.4 | 0.7 | 0.1 | 0.25 | 0.008 | 1.20 | 0.80 | 0.0031 | 0.0097 | 3.5% |
| 28 | 72.2 | 2.0 | 3.9 | 7.6 | 13.4 | 0.7 | 0.1 | 0.25 | 0.008 | 1.20 | 0.80 | 0.0028 | 0.0099 | 3.5% |
| 29 | 72.2 | 2.0 | 3.9 | 7.6 | 13.4 | 0.7 | 0.1 | 0.25 | 0.008 | 1.20 | 0.80 | 0.0025 | 0.0091 | 3.7% |
| 30 | 72.6 | 2.1 | 3.9 | 7.7 | 12.9 | 0.7 | 0.1 | 0.25 | 0.012 | 1.20 | 0.80 | 0.0034 | 0.0021 | 5.3% |
| 31 | 72.9 | 1.7 | 3.9 | 7.7 | 13.0 | 0.7 | 0.1 | 0.23 | 0.021 | 1.35 | 1.00 | 0.0032 | 0.0015 | 10.0% |
| 32 | 72.9 | 1.7 | 3.9 | 7.7 | 13.0 | 0.7 | 0.1 | 0.25 | 0.026 | 1.35 | 1.00 | 0.0022 | 0.0009 | 11.8% |
| 33 | 72.9 | 1.7 | 3.9 | 7.7 | 13.0 | 0.7 | 0.1 | 0.25 | 0.031 | 1.35 | 1.00 | 0.0018 | 0.0006 | 13.6% |
| 34 | 72.9 | 1.7 | 3.9 | 7.7 | 13.0 | 0.7 | 0.1 | 0.25 | 0.034 | 1.35 | 1.00 | 0.0028 | 0.0005 | 15.1% |
| 35 | 72.9 | 1.7 | 3.9 | 7.7 | 13.0 | 0.7 | 0.1 | 0.25 | 0.017 | 1.50 | 0.80 | 0.0030 | 0.0004 | 7.6% |
| 36 | 72.9 | 1.7 | 3.9 | 7.7 | 13.0 | 0.7 | 0.1 | 0.25 | 0.019 | 1.50 | 0.80 | 0.0028 | 0.0006 | 8.4% |
| 37 | 72.9 | 1.7 | 3.9 | 7.7 | 13.0 | 0.7 | 0.1 | 0.25 | 0.020 | 1.50 | 0.80 | 0.0026 | 0.0006 | 9.0% |
| 38 | 72.9 | 1.7 | 3.9 | 7.7 | 13.0 | 0.7 | 0.1 | 0.25 | 0.021 | 1.50 | 0.80 | 0.0038 | 0.0004 | 9.5% |

TABLE 3

| Example No. | Base composition (wt %) | | | | | | | Colorant composition (parts by weight) | | | | | | REDOX |
|---|---|---|---|---|---|---|---|---|---|---|---|---|---|---|
| | SiO2 | Al2O3 | MgO | CaO | Na2O | K2O | SO3 | t-Fe2O3 | FeO | TiO2 | CeO2 | CoO | Se | |
| 39 | 72.9 | 1.7 | 3.9 | 7.7 | 13.0 | 0.7 | 0.1 | 0.25 | 0.023 | 1.50 | 0.80 | 0.0006 | 0.0005 | 10.3% |
| 40 | 72.9 | 1.7 | 3.9 | 7.7 | 13.0 | 0.7 | 0.1 | 0.25 | 0.023 | 1.50 | 0.80 | 0.0026 | 0.0003 | 10.4% |
| 41 | 72.9 | 1.7 | 3.9 | 7.7 | 13.0 | 0.7 | 0.1 | 0.25 | 0.026 | 1.50 | 0.80 | 0.0018 | 0.0002 | 11.6% |
| 42 | 72.9 | 1.7 | 3.9 | 7.7 | 13.0 | 0.7 | 0.1 | 0.25 | 0.026 | 1.50 | 0.80 | 0.0024 | 0.0003 | 11.7% |
| 43 | 72.9 | 1.7 | 3.9 | 7.7 | 13.0 | 0.7 | 0.1 | 0.25 | 0.027 | 1.50 | 0.80 | 0.0026 | 0.0004 | 11.9% |
| 44 | 72.9 | 1.7 | 3.9 | 7.7 | 13.0 | 0.7 | 0.1 | 0.25 | 0.028 | 1.50 | 0.80 | 0.0038 | 0.0004 | 12.6% |
| 45 | 72.9 | 1.7 | 3.9 | 7.7 | 13.0 | 0.7 | 0.1 | 0.40 | 0.031 | 1.50 | 0.40 | 0.0007 | 0.0027 | 8.6% |
| 46 | 72.9 | 1.7 | 3.9 | 7.7 | 13.0 | 0.7 | 0.1 | 0.40 | 0.036 | 1.50 | 0.40 | 0.0008 | 0.0017 | 10.0% |
| 47 | 72.6 | 2.1 | 3.9 | 7.7 | 12.9 | 0.7 | 0.1 | 0.25 | 0.008 | 1.50 | 0.80 | 0.0026 | 0.0080 | 3.6% |
| 48 | 72.6 | 2.1 | 3.9 | 7.7 | 12.9 | 0.7 | 0.1 | 0.25 | 0.009 | 1.50 | 0.80 | 0.0027 | 0.0073 | 4.0% |
| 49 | 72.6 | 2.1 | 3.9 | 7.7 | 12.9 | 0.7 | 0.1 | 0.25 | 0.009 | 1.50 | 0.80 | 0.0030 | 0.0076 | 4.1% |
| 50 | 72.6 | 2.1 | 3.9 | 7.7 | 12.9 | 0.7 | 0.1 | 0.25 | 0.009 | 1.50 | 0.80 | 0.0033 | 0.0075 | 4.0% |
| 51 | 72.6 | 2.1 | 3.9 | 7.7 | 12.9 | 0.7 | 0.1 | 0.25 | 0.010 | 1.50 | 0.80 | 0.0029 | 0.0039 | 4.6% |
| 52 | 72.9 | 1.7 | 3.9 | 7.7 | 13.0 | 0.7 | 0.1 | 0.30 | 0.033 | 1.90 | 0.40 | 0.0014 | 0.0005 | 12.2% |
| 53 | 72.9 | 1.7 | 3.9 | 7.7 | 13.0 | 0.7 | 0.1 | 0.24 | 0.022 | 2.00 | 1.00 | 0.0022 | 0.0010 | 10.2% |
| 54 | 72.9 | 1.7 | 3.9 | 7.7 | 13.0 | 0.7 | 0.1 | 0.24 | 0.022 | 1.35 | 1.80 | 0.0022 | 0.0010 | 10.2% |
| 55 | 72.9 | 1.7 | 3.9 | 7.7 | 13.0 | 0.7 | 0.1 | 0.16 | 0.014 | 1.35 | 1.00 | 0.0000 | 0.0010 | 9.7% |
| 56 | 72.9 | 1.7 | 3.9 | 7.7 | 13.0 | 0.7 | 0.1 | 0.60 | 0.054 | 1.35 | 1.00 | 0.0000 | 0.0010 | 10.0% |

TABLE 4

| Example No. | Tva (%) at 4 mm | TE (%) at 4 mm | Dw (nm) | Pe (%) at 4 mm | T370 (%) at 3.5 mm | Tuv (%) at 5 mm |
|---|---|---|---|---|---|---|
| 1 | 82.2 | 75.9 | 574.4 | 9.3 | 31.0 | 6.52 |
| 2 | 80.0 | 72.5 | 575.0 | 10.4 | 30.5 | 6.36 |
| 3 | 72.8 | 70.2 | 579.6 | 11.0 | 38.3 | 9.15 |
| 4 | 73.9 | 70.5 | 579.1 | 10.8 | 39.5 | 9.57 |
| 5 | 77.3 | 70.8 | 573.8 | 6.0 | 35.6 | 8.25 |
| 6 | 70.9 | 72.3 | 578.4 | 6.7 | 31.2 | 6.72 |
| 7 | 69.5 | 68.7 | 580.4 | 10.3 | 36.8 | 8.62 |
| 8 | 74.6 | 73.8 | 577.5 | 7.0 | 32.6 | 7.13 |
| 9 | 73.6 | 73.7 | 577.7 | 7.4 | 32.2 | 7.01 |
| 10 | 73.6 | 73.6 | 577.7 | 7.9 | 32.2 | 7.01 |
| 11 | 68.3 | 71.1 | 577.9 | 5.6 | 31.5 | 6.84 |
| 12 | 71.4 | 72.5 | 576.7 | 6.2 | 34.0 | 7.60 |
| 13 | 70.7 | 70.8 | 578.9 | 9.4 | 29.8 | 6.32 |
| 14 | 69.1 | 70.3 | 578.2 | 8.0 | 31.1 | 6.70 |
| 15 | 78.4 | 79.4 | 567.6 | 2.7 | 35.8 | 8.12 |
| 16 | 72.8 | 71.1 | 576.4 | 5.1 | 31.9 | 6.92 |
| 17 | 69.2 | 71.4 | 577.0 | 5.0 | 30.9 | 6.64 |
| 18 | 67.9 | 69.6 | 577.1 | 6.5 | 28.9 | 6.02 |
| 19 | 69.0 | 67.3 | 578.6 | 10.0 | 28.9 | 6.05 |

TABLE 5

| Example No. | Tva (%) at 4 mm | TE (%) at 4 mm | Dw (nm) | Pe (%) at 4 mm | T370 (%) at 3.5 mm | Tuv (%) at 5 mm |
|---|---|---|---|---|---|---|
| 20 | 68.9 | 67.3 | 577.5 | 8.9 | 30.1 | 6.39 |
| 21 | 68.1 | 66.6 | 578.3 | 9.5 | 29.5 | 6.21 |
| 22 | 69.7 | 72.7 | 578.8 | 8.5 | 31.2 | 6.73 |
| 23 | 73.0 | 76.5 | 574.3 | 4.1 | 34.2 | 7.58 |
| 24 | 77.0 | 78.0 | 576.2 | 4.6 | 36.8 | 8.46 |
| 25 | 69.4 | 69.5 | 578.3 | 10.8 | 28.8 | 5.98 |
| 26 | 74.5 | 76.2 | 575.9 | 6.7 | 33.1 | 7.26 |
| 27 | 71.3 | 74.7 | 578.6 | 7.4 | 31.3 | 6.77 |
| 28 | 72.3 | 74.7 | 578.7 | 8.4 | 29.7 | 6.27 |
| 29 | 72.8 | 74.6 | 578.7 | 9.6 | 29.1 | 6.08 |
| 30 | 72.0 | 74.5 | 573.9 | 4.4 | 34.5 | 7.68 |
| 31 | 68.1 | 69.0 | 578.8 | 8.9 | 27.4 | 5.64 |
| 32 | 70.1 | 67.3 | 578.1 | 11.0 | 27.9 | 5.76 |
| 33 | 71.2 | 66.6 | 577.5 | 11.4 | 28.1 | 5.81 |
| 34 | 68.2 | 64.6 | 575.9 | 9.0 | 28.4 | 5.88 |
| 35 | 75.2 | 74.4 | 568.9 | 3.5 | 34.6 | 7.74 |
| 36 | 73.9 | 72.6 | 573.4 | 5.6 | 32.4 | 7.07 |
| 37 | 73.8 | 71.7 | 574.9 | 6.8 | 31.8 | 6.88 |
| 38 | 70.6 | 70.8 | 567.4 | 3.0 | 34.6 | 7.54 |

TABLE 6

| Example No. | Tva (%) at 4 mm | TE (%) at 4 mm | Dw (nm) | Pe (%) at 4 mm | T370 (%) at 3.5 mm | Tuv (%) at 5 mm |
|---|---|---|---|---|---|---|
| 39 | 79.5 | 78.3 | 576.1 | 10.7 | 32.2 | 6.97 |
| 40 | 75.0 | 71.4 | 573.2 | 6.3 | 33.1 | 7.31 |
| 41 | 75.6 | 70.2 | 574.9 | 8.5 | 31.9 | 6.90 |
| 42 | 73.2 | 69.4 | 574.4 | 7.3 | 31.7 | 6.87 |
| 43 | 72.0 | 68.6 | 575.1 | 7.7 | 31.2 | 6.67 |
| 44 | 68.5 | 66.9 | 571.7 | 6.1 | 27.5 | 5.64 |
| 45 | 68.6 | 64.1 | 579.5 | 18.8 | 28.6 | 5.97 |
| 46 | 69.7 | 63.3 | 578.1 | 17.3 | 30.4 | 6.49 |
| 47 | 74.7 | 76.3 | 576.9 | 7.6 | 32.5 | 7.09 |
| 48 | 77.1 | 75.6 | 574.1 | 5.0 | 34.0 | 7.54 |
| 49 | 72.3 | 74.6 | 577.2 | 7.1 | 28.2 | 5.83 |
| 50 | 73.7 | 76.2 | 575.3 | 3.8 | 32.8 | 7.20 |
| 51 | 75.5 | 76.6 | 572.8 | 4.5 | 33.1 | 7.29 |
| 52 | 73.8 | 66.9 | 576.2 | 11.9 | 42.9 | 8.25 |
| 53 | 69.8 | 70.2 | 574.6 | 10.5 | 25.7 | 3.59 |
| 54 | 68.5 | 70.8 | 581.1 | 13.2 | 9.1 | 0.01 |
| 55 | 81.3 | 79.6 | 582.2 | 12.3 | 35.9 | 8.48 |
| 56 | 65.4 | 55.4 | 580.2 | 22.8 | 8.9 | 0.08 |

The glass of the present invention has a relatively high visible ray transmittance and adequately absorbs ultraviolet rays. Accordingly, it is effective for preventing deterioration of interior materials or seats by ultraviolet rays, or preventing sunburn of a person who is inside. Thus, it is particularly useful for window glasses for buildings or vehicles.

What is claims is:

1. Ultraviolet ray absorbing colored glass, which comprises 100 parts by weight of soda lime silicate glass as a base component and coloring components consisting essentially of from 0.12 to 0.7 part by weight of total iron as calculated as $Fe_2O_3$, from 0.2 to 2.0 parts by weight of total cerium as calculated as $CeO_2$, from 1.0 to 2.5 parts by weight of total titanium as calculated as $TiO_2$, from 0.0018 to 0.01 part by weight of CoO and from 0.0001 to 0.02 part by weight of Se, and which has an ultraviolet ray transmittance of at most 10%, as stipulated in ISO-9050 and as calculated as of a thickness of 5 mm, whereby the dominant wavelength measured by illuminant C is within a range of from 565 to 600 nm, wherein the proportion of bivalent iron as calculated as $Fe_2O_3$ in the total iron as calculated as $Fe_2O_3$ is at most 19%.

2. The ultraviolet ray absorbing colored glass according to claim 1, which comprises 100 parts by weight of soda lime silicate glass as a base component and coloring components consisting essentially of from 0.12 to 0.4 part by weight of total iron as calculated as $Fe_2O_3$, from 0.2 to 1.5 parts by weight of total cerium as calculated as $CeO_2$, from 1.0 to 2.5 parts by weight of total titanium as calculated as $TiO_2$, from 0.002 to 0.01 part by weight of CoO and from 0.0001 to 0.02 part by weight of Se, wherein the proportion of bivalent iron as calculated as $Fe_2O_3$ in the total iron as calculated as $Fe_2O_3$ is at most 19%.

3. The ultraviolet ray absorbing colored glass according to claim 2, whereby the dominant wavelength measured by illuminant C is within a range of from 570 to 600 nm, and the excitation purity is at most 12%.

4. The ultraviolet ray absorbing colored glass according to claim 1, which has a visible ray transmittance of at least 70% as measured by illuminant A as of a thickness of from 3 to 5 mm.

5. The ultraviolet ray absorbing colored glass according to claim 2, which has a visible ray transmittance of at least 70% as measured by illuminant A as of a thickness of from 2 to 6 mm.

6. The ultraviolet ray absorbing colored glass according to claim 1, wherein the soda lime silicate glass comprises the following components:

| | |
|---|---|
| $SiO_2$ | 65 to 75 wt % |
| $Al_2O_3$ | 0.1 to 5 wt % |
| $Na_2O$ | 10 to 18 wt % |
| $K_2O$ | 0 to 5 wt % |
| CaO | 5 to 15 wt % |
| MgO | 0 to 6 wt %. |

7. The ultraviolet ray absorbing colored glass according to claim 2, wherein the soda lime silicate glass comprises the following components:

| | |
|---|---|
| $SiO_2$ | 65 to 75 wt % |
| $Al_2O_3$ | 0.1 to 5 wt % |
| $Na_2O$ | 10 to 18 wt % |
| $K_2O$ | 0 to 5 wt % |
| CaO | 5 to 15 wt % |
| MgO | 0 to 6 wt %. |

8. A glass sheet which is made of the ultraviolet absorbing glass according to claim 1, and which has an ultraviolet ray transmittance of at most 10%, as stipulated in ISO-9050, in the real thickness.

9. A glass sheet which is made of the ultraviolet absorbing glass according to claim 2, and which has an ultraviolet ray transmittance of at most 10%, as stipulated in ISO-9050, in the real thickness.

10. The ultraviolet ray absorbing colored glass according to claim 1, wherein said glass comprises 0.002 to 0.01 parts by weight of CoO.

11. A method for making the ultraviolet ray absorbing colored glass of claim 1, comprising melting a composition, thereby forming a melt, wherein said melt comprises 100 parts by weight of soda lime silicate glass as a base component and coloring components consisting essentially of from 0.12 to 0.7 part by weight of total iron as calculated as $Fe_2O_3$, from 0.2 to 2.0 parts by weight of total cerium as calculated as $CeO_2$, from 1.0 to 2.5 parts by weight of total titanium as calculated as $TiO_2$, from 0.0018 to 0.01 part by weight of CoO and from 0.0001 to 0.02 part by weight of Se.

12. The method of claim 11, further comprising forming said melt into a glass object and annealing said object.

13. The method of claim 11, wherein said melt comprises 0.002 to 0.01 parts by weight of CoO.

* * * * *